Patented Mar. 16, 1937

2,073,666

UNITED STATES PATENT OFFICE 2,073,666

METHOD OF HARDENING PROTEINS

Christian J. Wernlund, Niagara Falls, N. Y., assignor to E. I. du Pont de Nemours & Company, Wilmington, Del., a corporation of Delaware No Drawing. Application July 17, 1935, Serial No. 31,894

30 Claims. (Cl. 91—68)

This invention relates to tanning or hardening of protein materials and more particularly to the use of inorganic protein hardening agents for this purpose.

In various manufacturing processes protein materials are brought into solution or semi-solution and subsequently are tanned or hardened by treatment with chemical agents hereinafter referred to as hardening agents. For example, sized or coated papers may be made by impregnating or coating paper with a solution of protein or a composition containing dissolved protein and subsequently treating the paper with tannin, formaldehyde, alum, aluminum acetate, chromate or other hardening agent which changes the protein to a relatively insoluble, "hardened" state. This method, for example, is utilized in making so-called washable wallpaper by coating or printing the paper with an aqueous composition containing glue or casein mixed with suitable pigments or colors and subsequently treating the coated paper with formaldehyde, alum or other protein hardening agent. The hardening of proteins also may be utilized in processes of gluing together articles of wood or other materials by the application of a protein adhesive, e. g., animal glue, casein solutions or the like. One method of accomplishing this is to add a protein hardening agent to the protein adhesive just prior to its application. Still another method of utilizing protein hardening is in the manufacture of the so-called protein plastics which are made by incorporating solubilized or partly solubilized protein material, e. g., casein, with suitable fillers, pigments or colors, molding the material into suitable forms such as films, sheets, or various other shapes and finally treating the molded articles with a solution of a protein hardening agent until the desired degree of hardness and insolubility is obtained.

An object of the present invention is to provide an improved method for hardening proteins by means of inorganic hardening agents in various manufactures which involve the hardening of proteins. A further object is to provide an improved method for sizing or coating papers, fabrics or other fibrous materials with a hardened protein. My invention also includes novel protein-containing compositions suitable for making coated or sized fibrous materials or for various uses involving the formation of hardened protein films or masses. Other objects will be apparent from the following description of the invention.

The above objects are attained in accordance with the present invention by preparing a composition containing a protein material solubilized or partly solubilized by means of water or other suitable solvent, to which composition is added or formed therein a basic and inactive compound of a metal whose salts act as protein hardening agents, together with sufficient volatile alkalining agent such as ammonia to maintain the metal compound in the basic inactive state and an acid forming substance, which, upon removal of the volatile alkali, will form an acid capable of reacting with the said metal compound to produce a relatively soluble metal compound which is capable of hardening protein. For example, I may add to the protein coating composition, aluminum hydroxide (preferably in the colloidal state), together with an acid forming substance such as ammonium formate or formamide and a volatile alkali such as ammonia. So long as the alkalinity of the composition remains sufficiently high, e. g., at a pH value of 6 or higher the aluminum present remains in the form of aluminum hydroxide and substantially no protein hardening action occurs. When it is desired to harden the protein, I subject the composition to drying or to a heat treatment, whereupon the volatile alkali is removed by evaporation and the acid resulting from the acid forming substance reacts with the aluminum hydroxide to form a soluble aluminum salt which in turn acts to harden the protein. In place of adding aluminum hydroxide to the composition I may add an aluminum salt, having first made the solution sufficiently alkaline so that the aluminum salt reacts to precipitate colloidal aluminum hydroxide or other inactive, basic aluminum compound. This ordinarily is the preferred method since the aluminum hydroxide in colloidal form appears to react more readily with the acid subsequently formed to produce the soluble aluminum salt hardening agent. Thus, I may add aluminum acetate to the ammoniacal solution, whereby colloidal aluminum hydroxide and/or insoluble, basic aluminum acetate is formed in situ, together with a corresponding amount of ammonium acetate. Likewise, I may add sufficient ammonia to a solution of aluminum acetate to substantially completely precipitate the aluminum and add the resulting mixture, without filtering, to the protein composition. In preparing these compositions, I take into consideration the natural acidity of the protein employed and of other materials which may be present and add sufficient ammonia or other alkali so that the final alkalinity will be sufficiently great to prevent substantial transformation of the inactive basic aluminum compound to an active protein hardener.

It is understood that compounds of various other metals such as iron, zinc or lead may be used in a similar manner in place of aluminum compounds. I prefer to use aluminum compounds, because of their greater hardening effect.

The acid forming substances used in the protein composition in the process of the present invention are those acid salts or acid derivatives, e. g., amides which are relatively readily decomposed, e. g., by heat or hydrolysis to liberate acid or acid salt. Samples of such acid forming materials are formamide or other fatty acid amides of fatty acids, ammonium salts of organic acids, e. g., ammonium formate esters of organic acids which readily hydrolyze, e. g. alkyl formates or substances such as methylol formamide or other methylol amides which readily break down to form acid amides. Alkyl formates, for example, methyl formate, are especially suitable since they readily hydrolyze to an aliphatic alcohol and formic acid. Formaldehyde derivatives such as paraform or hexamethylene tetramine which slowly decomposes to form formaldehyde, which in turn may be readily oxidized to formic acid also may be utilized as acid forming ingredients in my invention. In this case, I prefer to add an oxidation catalyst to the composition, so that during the drying operation the air oxidation of the aldehyde is accelerated. In general, the acid forming substances are materials which tend to form acids when the volatile alkali is removed by drying. In using acid esters, e. g., an alkyl formate, some hydrolysis may occur in the alkaline solution and I prefer to have present sufficient alkali to neutralize any acid thus formed. The resulting acid salt then may hydrolyze to liberate free acid when the volatile alkali is subsequently removed.

I prefer to use formamide as the acid-forming constituent, either alone or in conjunction with other acid forming constituents, since I have found that formamide has certain properties which make it especially well adapted for the purpose. One advantageous property of formamide is that it is highly hygroscopic and thus tends to prevent undue drying out of the protein during the drying step. It is important that the drying be limited or be sufficiently slow, so that there is sufficient water present to act as a solvent for the reactions which occur. Further, formamide acts as a solvent for aluminum salts, protein and possibly other ingredients and thus aids in the chemical process. Formamide also has the ability to dissolve carbon dioxide from the air, which aids in bringing the composition to the desired state of acidity on removal of the volatile alkalis. I have also found that the formamide acts as a plasticizer for the resulting film or mass of hardened protein which is formed.

If the acid forming substance is to be a hydrolyzable ammonium salt, the salt per se may be added, or the free acid may be added to the protein composition, together with an equivalent amount of ammonia; or a metal salt of the acid which salt acts as a protein hardening agent (e. g., aluminum acetate, formate, etc.) may be added to the ammoniacal composition, whereby the basic metal compound is precipitated and the ammonium salt is formed in situ. Among the various weak acids whose ammonium salts may be employed are the fatty acids; and it is sometimes advantageous to use, in whole or in part, a higher fatty acid which has a plasticizing action in the final composition. Thus, I may add, for example, aluminum stearate to the ammoniacal composition.

My method is applicable to the hardening of various types of proteins and adapted to various manufacturing processes. For example, it is excellently adapted to the manufacture of protein sized papers in which casein or glue is used as the protein sizing material. Likewise, it is suitable for the production and use of adhesives made of casein, animal glue or vegetable proteins such as proteins derived from leguminous seeds, for example, soy beans.

My invention is especially well adapted for the manufacture of water resistant, coated papers such as wallpapers and a description of one method of making such products will be employed to illustrate the invention. To produce a washable type of wallpaper, I may prepare an aqueous coating composition containing solubilized glue or casein, together with suitable clay or other filler or coloring or pigments. To this I may add a quantity of ammonium hydroxide in sufficient amount so that the final composition, after the addition of all other ingredients is neutral or alkaline in reaction. I then may add an aluminum salt such as aluminum acetate or alum in an amount sufficient for hardening the protein present to the desired extent. At the same time or previously or thereafter, I may add a small quantity of an acid forming substance or an acid, e. g., formamide, ammonium formate, formic acid, acetic acid or the like.

The aluminum salt when added reacts with the alkaline solution to form a colloidal form of aluminum hydroxide and a corresponding ammonium salt. Alternatively, I may add aluminum hydroxide either in the dry state or in the form of a colloidal precipitate, in place of an aluminum salt. In this case, the amount of alkali required obviously is less than when the alkaline material in the solution is utilized to precipitate the aluminum hydroxide. The amount of acid forming substance also may vary with the nature of the aluminum compound added. If the aluminum compound is added as the hydroxide, the amount of acid or acid forming substance added should be not less than about the stoichiometrical equivalent of the aluminum compound; preferably a slight excess is employed. If an aluminum salt of a weak acid, e. g., aluminum acetate, is added, little or no additional acid or acid forming compounds is required since this may be furnished by the acid radical of the aluminum compound added, which reacts to form an ammonium salt.

The above described composition prepared in the proper consistency is applied to the paper web in a suitable manner, e. g., by brushing or printing, and thereupon is passed to a drying operation. Any desired method of drying may be used but the drying should not be carried out to the point where the material is completely dried within the time required for the hardening action to take place. Preferably I dry the paper at a temperature of 80–150° F. to a point where the absolute moisture content is from 10–20% of the protein composition applied to the paper. The paper then is allowed to stand either in festoons or in rolls at ordinary temperatures, whereupon the hardening action is usually complete within 24–48 hours. The actual time required to complete the hardening generally will vary according to the rate of formation of hardening agent in the composition; this time may vary from a few hours to a week. If desired, the treated paper may be dried at ordinary room temperature. During the drying operation, the volatile alkali is driven off, the acid-forming substance liberates acid and a relatively soluble aluminum salt is formed which hardens the protein in the coating. By this means the protein is readily hardened to the required degree in a single coating and drying treatment, as compared with the usual practice which requires first coating the paper and then application of the hardening agent.

My invention is further illustrated by the following examples:

*Example I*

A paper coating composition was prepared as follows:

A clay-color water suspension was first prepared, containing:

| | Parts by weight |
|---|---|
| Clay | 90 |
| Blanc fix (50% paste) | 10 |
| Naphthol green (50% paste) | 10 |
| Paraform | 1 |
| Water | 100 |
| Ammonia | 1.5 |

Milled to a smooth paste.

The following glue-formamide solution was now prepared and this was then milled into the above clay-color suspension:

| | Parts by weight |
|---|---|
| Hide glue (33% solution) | 30 |
| Formamide | 2.25 |

A colloidal basic aluminum acetate precipitate was then prepared as noted below and this was milled into the clay-glue mixture above:

| | Parts by weight |
|---|---|
| Aluminum acetate (20% solution) | 16 |
| Water | 5 |
| Ammonia (26%) | 6.75 |
| Phenol red indicator (pH 6.8 to 8.4) | |

The ammonia was added last, until the mixture was slightly pink at the end and had a slight odor of ammonia.

Twenty parts by weight of water then was added to bring the specific gravity of the mixture to 33° Baumé.

Wallpaper stock then was coated and air dried. Upon aging 3 hours the coatings were about 95% washable and after aging 12 hours were fully washable, as determined by rubbing twenty times with a wet sponge.

These coatings were so flexible after aging for one week that on being folded and squeezed between the fingers no visible cracking of the coatings occurred.

*Example II*

A commercial wallpaper ground coating mixture was used as a base. The formula of this material was approximately as follows:

| | Parts by weight |
|---|---|
| Clay | 90 |
| Naphthol green (50% paste) | 10 |
| Water (about) | 140 |
| Glue (33% solution) | 30 |

The above were milled to a smooth paste and water added to a Baumé of 30°.

To 126 parts by weight of the above solution was now added with good stirring in the order named:

| | Parts by weight |
|---|---|
| Formamide | 2.2 |
| Ammonia | 2. |
| Formaldehyde | 0.1 |
| Aluminum acetate (20% solution) | 2.73 |

The solution was not coagulated or made sluggish by the above additions and did not coagulate or spoil during one week's storage.

Coatings were now applied to wallpaper and dried one-half hour at 32° C. and then aged at room temperature for three months. Another set of samples were air dried and similarly aged. After two days' aging, fully washable coatings were obtained which were so plastic that they did not crack visibly on bending sharply at an angle of 180°. These coatings were observed for a period of three months and were then found to have practically the same pliability as when first insolubilized. The marked plasticizing action of the formamide in these coatings was thus effective in preventing the over tanning of the protein by the tanning agents.

*Example III*

Colloidal ferric hydrate, precipitated on calcium sulfate, was substituted in this case for the basic aluminum acetate.

The coating mixture was prepared as follows:

| | Parts by weight |
|---|---|
| Clay | 300 |
| Ferric hydrate (ferrite yellow) | 20 |
| Water | 300 |

The above were milled to a smooth paste; then was added 120 parts by weight of a 33% glue solution. The mixture then was well milled and diluted with water to a consistency of 30° Baumé.

To 126 parts by weight of the resulting mixture was added a mixture of:

| | Parts by weight |
|---|---|
| Formamide | 1.12 |
| Paraformaldehyde | 0.50 |

The whole was then thoroughly milled and coated on wallpaper stock. The coatings were dried for one-half hour at 32° C. and then aged at room temperature and examined intermittently for two months. After 24 hours' aging, the coatings showed but little insolubilization. After four days' aging, a considerable insolubilization of the coating had taken place. After two weeks about 80% insolubilization had taken place. After two months of aging, the coatings were completely washable. The iron hydrate reaction was thus slower than when aluminum salts were used.

The solutions kept their original consistency for five days with no tendency to settle out to a hard mass as frequently occurs in compositions of this type and there was no spoilage.

In preparing my novel protein compositions for use in coating paper or for other uses as mentioned below, the properties of the various ingredients will be varied as required for the particular purposes intended and for the results desired. Such proportions in general will be apparent to those skilled in preparing hardened protein products. For example, in adapting my invention to the manufacture of washable wallpaper, the amount of metal compound to furnish the hardening agent will be varied to produce the degree of hardness desired. In this method, when using an aluminum compound as hardening agent, I prefer to add an amount of the aluminum compound equivalent to aluminum acetate equal to around 10% by weight of the protein present. If desired, smaller amounts may be used, e. g., 5% or larger amounts, e. g., up to around 20% of the weight of the protein. The amount of volatile alkali may be varied within wide limits. While good results may be obtained with a substantial excess of volatile alkali, e. g., ammonia, I have found that small amounts are generally to be preferred, to avoid under fumation of alkali fumes during drying. The minimum amount of alkali in the composition is that which will maintain the metal compound in a basic, inactive state and often it is not necessary that the solution be distinctly alkaline for this purpose. In fact, when using certain metal compounds, e. g., those of aluminum or lead which form insoluble basic salts, the alkalinity of the composition may be equivalent to a pH value as low as around 5 to 6. This critical degree of alkalinity may vary for other metal compounds. Thus, for zinc compounds, the alkalinity of the composition should not be lower than about a pH of 7. When using an aluminum compound as hardening agent, I prefer that the composition be substantially free from zinc compounds, because the zinc compound, which goes into solution at a higher alkalinity than the aluminum, generally will be substantially completely reacted with the protein before the aluminum compound is converted to the soluble, active state. Since zinc-hardened protein is more soluble than aluminum-hardened protein, the advantageous effect of aluminum as the hardening agent is not realized if zinc is present in material amounts.

It is to be understood that the alkalinity of the composition may be in part adjusted by the use of non-volatile alkalies, e. g. borax, sodium hydroxide, sodium carbonate and the like; but the amount of volatile alkali present, in either free or combined state, must be sufficient to allow the formation of acid to occur when the volatile alkali is removed by subsequent evaporation. For example, if a hydrolyzable ammonium salt such as ammonium formate is utilized as acid forming compound, it must be present in an amount at least stoichiometrically equivalent to the total non-volatile alkali present, in addition to the amount required to furnish the acid required to form the protein hardening agent on evaporation. In place of ammonia, other volatile alkalis may be used, e. g. alkyl amines such as methyl amine.

The proportion of acid forming ingredient also may vary over a wide range; a substantial excess causes no harm. Ordinarily I prefer to use such amount of acid forming substance that the acid formed is in slight excess over that theoretically required to react with the metal compound to produce the hardening agent. If desired, less than the theoretical amount may be used, in which case only a part of the metal compound will be changed to the soluble, active state required for hardening the protein.

Other ingredients, including protein, fillers such as clay, whiting and the like, pigments, dyes and plasticizers may be proportioned according to known principles of usage for the purpose in mind. The amount of water or other solvent likewise may be varied to adjust the viscosity of the mixture according to the use of application intended.

In addition to making coated or printed papers my improved method is likewise suitable for sizing paper or other fibrous material with a hardened protein in such manner that the hardened protein is incorporated within the body of the paper sheet. This may be accomplished, by impregnating the material to any desired degree of saturation e. g., by soaking the paper or passing the paper web through a bath containing solubilized protein and the other ingredients as described above for the making of coated paper. Similarly, my method may be utilized for printing or sizing textile fabrics.

Likewise, my novel sizing composition may be applied to paper by incorporating the various ingredients in the paper pulp at any suitable stage in the paper manufacturing process, e. g., in the beater, or at any point between the beater and the paper forming machine.

My novel protein compositions are useful in a variety of arts employing methods of hardening proteins, in addition to those mentioned above. For example, liquid or semi-liquid compositions prepared in accordance with the present invention may advantageously be employed as waterproof paints or as adhesives, since the compositions may stand for long periods of time with substantially no hardening or coagulation. Then, when applied and subjected to heat and/or drying, the protein is readily hardened to the desired degree. By the application of my invention in the art of making hardened protein plastics, e. g. of casein, the tedious and costly process of hardening by long soaking in hardening solutions is avoided. Various other applications of the method will be apparent to those skilled in the production of various hardened protein products.

I claim:

1. A process for preparing a hardened protein composition comprising preparing an aqueous composition containing a protein, an inorganic compound whose reaction product with an acid is a protein hardening agent, a volatile alkali in an amount sufficient to prevent substantial solution of said inorganic compound and an acid forming substance and thereafter subjecting said aqueous composition to conditions suitable for the formation of acid from said acid forming substance.

2. A process for preparing a hardened protein composition comprising adding to a solution of a protein a relatively insoluble aluminum compound soluble in a weak acid together with sufficient ammonia to prevent substantial solution of said aluminum compound, adding an acid forming substance to said solution and thereafter evaporating said solution to remove ammonia therefrom.

3. A process for preparing a hardened protein composition comprising preparing an aqueous composition containing a protein, a basic aluminum compound soluble in a weak acid, and a hydrolyzable ammonium salt of an acid capable of dissolving said aluminum compound, said salt being present in an amount sufficient to form sufficient acid on hydrolysis to at least partly dissolve said aluminum compound, the alkalinity of said aqueous composition corresponding to a pH value sufficiently high to prevent substantial solution of said aluminum compound and thereafter drying said aqueous composition to evaporate ammonia therefrom.

4. A process for preparing a hardened protein composition comprising preparing an aqueous alkaline composition containing a protein substance, a relatively insoluble inorganic compound whose reaction product with an acid is a protein hardening agent, a volatile alkali in an amount sufficient to prevent substantial solution of said inorganic compound and an acid forming substance and thereafter drying said composition to volatilize said volatile alkali.

5. A process for preparing a hardened protein composition comprising preparing an aqueous, alkaline composition containing a protein substance, a relatively insoluble hydroxide of a metal whose soluble salts are protein hardening agents, a volatile alkali in an amount sufficient to prevent substantial solution of said hydroxide and a substance capable of hydrolyzing to form an acid and thereafter drying said composition to volatilize said volatile alkali.

6. A process for preparing a hardened protein composition comprising preparing an aqueous, alkaline composition containing a protein substance, a relatively insoluble inorganic compound whose reaction product with an acid is a protein hardening agent, ammonia in an amount sufficient to prevent substantial solution of said inorganic compound and formamide and thereafter drying said composition to volatilize said ammonia.

7. A process for preparing a hardened protein composition comprising preparing an aqueous, alkaline composition containing a protein substance, a relatively insoluble inorganic compound whose reaction product with an acid is a protein hardening agent, ammonia in an amount sufficient to prevent substantial solution of said inorganic compound and ammonium formate and thereafter drying said composition to volatilize said ammonia.

8. A process for preparing a hardened protein composition comprising preparing an aqueous, alkaline composition containing animal glue, aluminum hydroxide, ammonia in an amount sufficient to prevent substantial solution of said aluminum hydroxide and formamide and thereafter drying said composition to volatilize said ammonia.

9. A process for preparing a hardened protein composition comprising preparing an aqueous, alkaline composition containing casein, aluminum hydroxide, ammonia in an amount sufficient to prevent substantial solution of said aluminum hydroxide and formamide and thereafter drying said composition to volatilize said ammonia.

10. A process comprising treating a fibrous material with an aqueous, substantially non-acidic composition containing a protein, a relatively insoluble inorganic compound whose reaction product with an acid is a protein hardening agent and at least one hydrolyzable acid forming compound and subjecting the treated material to drying conditions.

11. A process comprising applying to the surface of a web of fibrous material an aqueous composition containing a protein, a relatively insoluble inorganic compound whose reaction product with an acid is a protein hardening agent, a volatile alkali in an amount sufficient to prevent substantial solution of said inorganic compound, and a compound capable of hydrolyzing to form an acid and subjecting the treated material to drying conditions.

12. A process comprising applying to the surface of a paper web an aqueous composition containing a protein, a relatively insoluble inorganic compound whose reaction product with an acid is a protein hardening agent, a volatile alkali in an amount sufficient to prevent substantial solution of said inorganic compound and formamide and subjecting the treated material to drying conditions.

13. A process comprising applying to the surface of a paper web an aqueous composition containing a protein, a relatively insoluble aluminum compound whose reaction product with an acid is a protein hardening agent, ammonia in an amount sufficient to prevent substantial solution of said aluminum compound and formamide and subjecting the treated material to drying conditions.

14. A process comprising applying to the surface of a paper web an aqueous composition containing a protein, a relatively insoluble iron compound whose reaction product with an acid is a protein hardening agent, ammonia in an amount sufficient to prevent substantial solution of said iron compound and formamide and subjecting the treated material to drying conditions.

15. A process comprising applying to the surface of a paper web an aqueous composition containing animal glue, a relatively insoluble basic aluminum compound, at least one hydrolyzable ammonia salt of a weak acid and formamide and subjecting the treated material to drying conditions.

16. A process comprising applying to the surface of a paper web an aqueous composition containing casein, colloidal aluminum hydroxide, ammonia in an amount sufficient to prevent substantial solution of said aluminum hydroxide and a compound capable of hydrolyzing to form an acid and subjecting the treated material to drying conditions.

17. A process comprising applying to the surface of a paper web an aqueous composition containing animal glue, a relatively insoluble basic aluminum compound and a hydrolyzable ammonium salt of a weak acid and subjecting the treated material to drying conditions.

18. A process comprising applying to the surface of a paper web an aqueous composition containing animal glue, colloidal aluminum hydroxide, ammonia in an amount sufficient to prevent substantial solution of said aluminum hydroxide and ammonium formate and subjecting the treated material to drying conditions.

19. An aqueous composition comprising protein, a relatively insoluble inorganic compound whose reaction product with an acid is a protein hardening agent and at least one hydrolyzable ammonia compound in amount sufficient to furnish sufficient acid on hydrolysis to dissolve at least part of said inorganic compound, said composition being sufficiently alkaline to prevent said inorganic compound from reacting with said protein.

20. An alkaline aqueous composition comprising protein, a relatively insoluble inorganic compound whose reaction product with an acid is a protein hardening agent, a volatile alkali in an amount sufficient to prevent substantial solution of said inorganic compound and a compound capable of hydrolyzing to form an acid.

21. An alkaline aqueous composition comprising protein, a relatively insoluble inorganic compound whose reaction product with an acid is a protein hardening agent, a volatile alkali in an amount sufficient to prevent substantial solution of said inorganic compound and formamide.

22. An alkaline aqueous composition comprising protein, a relatively insoluble aluminum compound whose reaction product with an acid is a protein hardening agent, ammonia in an amount sufficient to prevent substantial solution of said aluminum compound and formamide.

23. An alkaline aqueous composition comprising animal glue, a relatively insoluble iron compound whose reaction product with an acid is a protein hardening agent, ammonia in an amount sufficient to prevent substantial solution of said iron compound and an acid forming compound.

24. An aqueous composition comprising protein, a relatively insoluble basic aluminum compound, formamide and ammonium acetate.

25. An aqueous composition comprising animal glue, colloidal aluminum hydroxide, ammonia in an amount sufficient to prevent substantial solution of said aluminum hydroxide and formamide.

26. An aqueous composition comprising casein, a relatively insoluble inorganic compound whose reaction product with an acid is a protein hardening agent, ammonia in an amount sufficient to prevent substantial solution of said inorganic compound and an acid forming compound.

27. An aqueous composition comprising protein, a relatively insoluble inorganic compound whose reaction product with an acid is a protein hardening agent and ammonium formate.

28. An aqueous composition comprising animal glue, a relatively insoluble basic aluminum compound and formamide.

29. An aqueous composition comprising protein, a relatively insoluble basic aluminum compound, and an acid forming substance.

30. An aqueous composition comprising protein, a relatively insoluble basic aluminum compound, formamide, and paraform.

CHRISTIAN J. WERNLUND.